United States Patent
Kim et al.

(10) Patent No.: US 8,570,878 B2
(45) Date of Patent: Oct. 29, 2013

(54) PACKET DECODING METHOD AND APPARATUS FOR DIGITAL BROADCAST SYSTEM

(75) Inventors: Kyung Min Kim, Anyang-si (KR); Seo Goo Lee, Anyang-si (KR); Jin Woo Roh, Suwon-si (KR); Byung Tae Kang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 280 days.

(21) Appl. No.: 12/876,575

(22) Filed: Sep. 7, 2010

(65) Prior Publication Data

US 2011/0058484 A1  Mar. 10, 2011

(30) Foreign Application Priority Data

Sep. 10, 2009 (KR) ................. 10-2009-0085171

(51) Int. Cl.
*G01R 31/08* (2006.01)
*H04L 12/43* (2006.01)

(52) U.S. Cl.
USPC ........... 370/242; 370/342; 370/458; 714/780; 714/776; 714/758; 455/452.1; 455/562.1

(58) Field of Classification Search
USPC .......... 370/242, 342, 458; 714/780, 776, 800, 714/751, 770, 752, 758, 755; 455/452.1, 455/562.1, 69; 375/260, 267
See application file for complete search history.

(56) References Cited

U.S. PATENT DOCUMENTS

| | | | |
|---|---|---|---|
| 7,783,958 B1* | 8/2010 | Eidson et al. | 714/780 |
| 2004/0031026 A1* | 2/2004 | Srinivasan | 717/161 |
| 2007/0220410 A1* | 9/2007 | Bae et al. | 714/800 |
| 2009/0070848 A1 | 3/2009 | Kim et al. | |
| 2010/0111109 A1* | 5/2010 | Herzog et al. | 370/474 |

FOREIGN PATENT DOCUMENTS

| | | |
|---|---|---|
| KR | 10-2009-0004653 A | 1/2009 |
| KR | 10-2009-0021102 A | 2/2009 |
| WO | 2009/005301 A1 | 1/2009 |
| WO | 2009/001212 A2 | 12/2009 |

\* cited by examiner

*Primary Examiner* — Andrew Chriss
*Assistant Examiner* — Jamal Javaid
(74) *Attorney, Agent, or Firm* — Jefferson IP Law, LLP

(57) ABSTRACT

A packet decoding method and apparatus of a digital broadcast system is provided for improving decoding performance by reordering blocks to be decoded and adjusting a number of decoding iterations of each block. A packet decoding method of the present invention includes measuring Signal-to-Noise Ratios (SNRs) of individual packets within a slot, determining a decoding order of the packets according to the SNRs, and decoding the packets in the decoding order. The decoding method and apparatus of a digital broadcast system according to the present invention performs decoding on the packets having the highest channel estimation performance first with reduced number of decoding iterations and reallocates the saved number of decoding iterations to remaining packets having relatively low channel estimation performance, thereby improving the decoding performance of the received packets.

14 Claims, 6 Drawing Sheets

PACKET DECODING METHOD AND APPARATUS FOR DIGITAL BROADCAST SYSTEM

PRIORITY

This application claims the benefit under 35 U.S.C. §119(a) of a Korean patent application filed on Sep. 10, 2009 in the Korean Intellectual Property Office and assigned Serial No. 10-2009-0085171, the entire disclosure of which is hereby incorporated by reference.

BACKGROUND OF THE INVENTION

1. Field of the Invention

The present invention relates to a digital broadcast system. More particularly, the present invention relates to a packet decoding method and apparatus of a digital broadcast system for improving decoding performance by reordering blocks to be decoded and adjusting a number of decoding iterations of each block.

2. Description of the Related Art

With the advance of data compression and communication technologies, recent digital broadcast systems are designed to provide high quality audio and video broadcast services with fixed and mobile terminals. These advanced broadcast systems include Digital Audio Broadcasting (DAB), Digital Audio Radio Broadcasting System, and Digital Multimedia Broadcast (DMB) supporting various audio, video, and data services. In North America, Advanced Television System Committee-Mobile/Handheld (ATSC-M/H) is employed as a mobile extension of the digital television broadcast standard ATSC.

In such digital broadcast systems, the transmitter encodes packets of data, and the receiver decodes the received packets. In the conventional digital broadcast system, however, the receiver performs decoding in the same duration and number of decoding iterations on every packet, resulting in degradation of decoding performance per packet.

SUMMARY OF THE INVENTION

An aspect of the present invention is to address the above-mentioned problems and/or disadvantages and to provide at least the advantages described below. Accordingly, an aspect the present invention is to provide a packet decoding method and apparatus for a digital broadcast system that is capable of preventing decoding performance degradation caused by the difference between channel estimation performances of the received packets.

Another aspect of the present invention is to provide a packet decoding method and apparatus for a digital broadcast system that is capable of improving decoding performance of a receiver by decreasing the number of decoding iterations for the packets having high channel estimation performance and increasing the number of decoding iterations for the packets having low channel estimation performance.

In accordance with an aspect of the present invention, a method for decoding packets in a digital broadcast system is provided. The method includes measuring Signal-to-Noise Ratios (SNRs) of individual packets within a slot, determining a decoding order of the packets according to the SNRs, and decoding the packets in the decoding order.

In accordance with another aspect of the present invention, an apparatus for decoding packets in a digital broadcast system is provided. The apparatus includes an SNR measurer for measuring SNRs of individual packets within a slot, a decoding controller for determining a decoding order of the packets according to the SNRs, and a decoder for decoding the packets in the decoding order.

In accordance with another aspect of the present invention, a method of decoding packets in a digital broadcast system is provided. The method includes measuring SNRs of individual packets within a slot, determining an order in which the packets within the slot will be decoded, based on the SNRs of the packets, for each packet to be decoded, assigning a maximum number of decoding iterations, decoding the packets in the determined order based on the assigned maximum number of decoding operations, and when a packet is decoded in less than the assigned maximum number of decoding operations, allocating remaining decoding operations to remaining packets within the slot that have not yet been decoded.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A packet decoding method for adjusting a decoding order and a number of decoding iterations according to the channel estimation performance of the received packet is described below with respect to exemplary embodiments of the present invention. Although the description is directed to the Advanced Television System Committee-Mobile/Handheld (ATSC-M/H) system as the mobile extension of the digital broadcast system in North America, exemplary embodiments of the present invention are not limited thereto. For example, exemplary embodiments of the present invention can be applied to other types of digital broadcast system and mobile communication system in which a transmitter transmits the data encoded in unit of packet, block, or symbol, and a receiver decodes the data in the corresponding unit.

Figure 1:
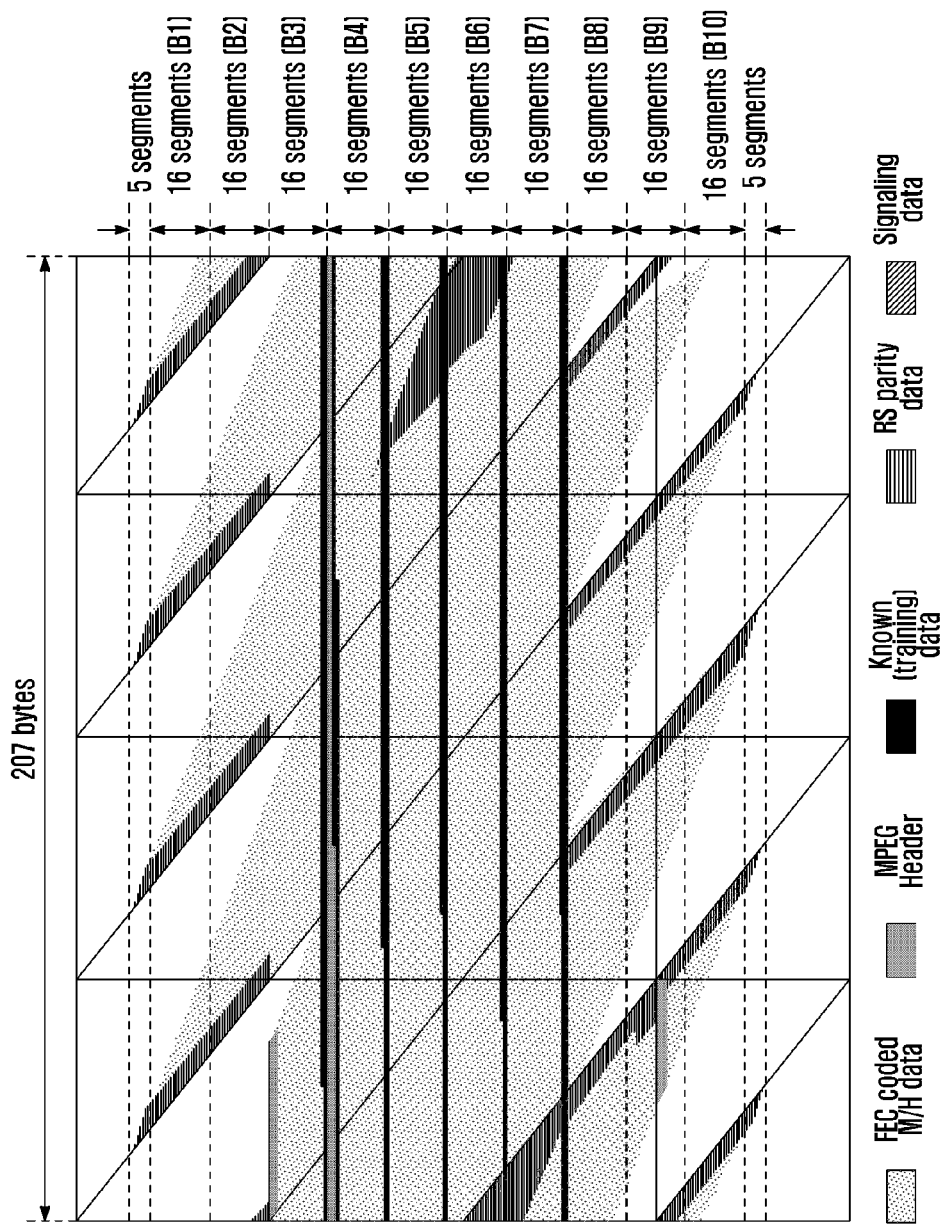
FIG. 1 is a diagram illustrating a structure of a slot as a unit for transmitting/receiving data in an Advanced Television System Committee-Mobile/Handheld (ATSC-M/H) system according to an exemplary embodiment of the present invention.

FIG. 1 is a diagram illustrating a structure of a slot as a unit for transmitting/receiving data in ATSC-M/H system according to an exemplary embodiment of the present invention.

Referring to FIG. 1, an ATSC-M/H slot includes a Forward Error Correction Coded M/H Data (FEC Coded M/H Data), Signaling Data, MPEG Header, and Training Data. The M/H data includes broadcast data, the Signaling Data includes the coding information (such as Transmission Parameter Channel (TPC) and Fast Information Channel (FIC)), and the Training Data includes the information for baseband signal synchronization and channel estimation.

One M/H slot includes 10 M/H blocks composed of 16 segments. The M/H block (hereinafter, called 'block') is also used as a unit of Serially Concatenated Convolutional Code (SCCC) encoding and transmission. The digital broadcast receiver performs decoding on the received signal in units of blocks. In the ATSC-M/H system, a block can correspond to a packet as the transmission unit in the normal digital broadcast system or mobile communication system. In the following description, the term "block" is used synonymously with the term "packet".

In view of the M/H slot, pilot signals are concentrated in the blocks B4 to B8 arranged in the middle of the slot but do not exist in the blocks B1 to B3 and B9 and B10 corresponding to the head and tail of the slot. A digital broadcast receiver performs channel estimation and equalization based on the pilot signals. The receiver performs interpolation and extrapolation for the area having no pilot signal to estimate the channel value. In the head and tail areas of the M/H shot, the interpolation and extrapolation based channel estimation degrades in performance. Accordingly, the decoding performance of the receiver is degraded in the head and tail areas having no pilot signal as compared to the blocks B4 to B8 where the pilot signals are concentrated.

In the conventional system, the Reed-Solomon decoding is performed after the SCCC decoding in order to overcome the performance degradation in the head and tail areas. However, this approach is limited for preventing the degradation of the decoding performance.

According to an exemplary embodiment of the present invention, a decoding method for preventing the decoding performance degradation caused by the difference of channel estimation performance between blocks is proposed. In order to prevent the decoding performance degradation caused by the channel estimation performance difference, the decoder adjusts the decoding order and number of decoding iterations depending on the channel estimation performance of the block. The decoding method according to an exemplary embodiment of the present invention is described in detail hereinafter with reference to FIGS. 2 to 6.

Figure 2:
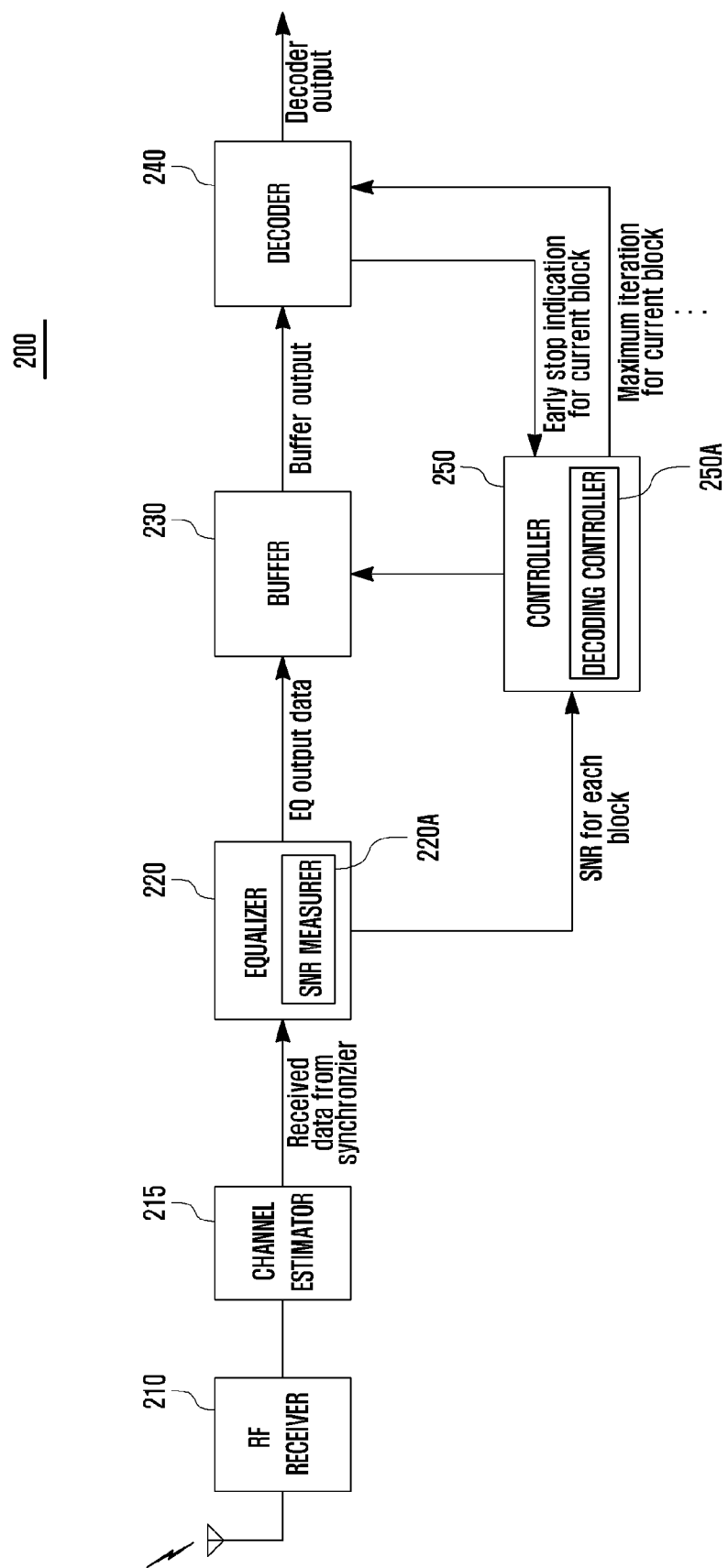
FIG. 2 is a diagram illustrating a configuration of a receiver according to an exemplary embodiment of the present invention.

FIG. 2 is a diagram illustrating a configuration of a receiver according to an exemplary embodiment of the present invention.

Referring to FIG. 2, the receiver 200 includes a Radio Frequency (RF) receiver 210, a channel estimator 215, an equalizer 220, a buffer 230, a decoder 240, and a controller 250. The equalizer 220 includes a Signal to Noise Ratio (SNR) measurer 220A, and the controller 250 includes a decoding controller 250A.

The RF receiver 210 receives the encoded data transmitted by a digital broadcast receiver in units of packets. Because it is assumed to direct the ATSC-M/H system, the packet can be the M/H block. The RF receiver 210 transfers the received block to the channel estimator 215.

The channel estimator 215 performs channel estimation with each block output by the RF receiver 210. The channel estimator 215 performs channel estimation with the pilot signals for the block carrying the pilot signals. The channel estimator 215 performs channel estimation using the interpolation and extrapolation for areas carrying no pilot signal. After completing the channel estimation on each block, the channel estimator 215 transmits the channel estimation value to the equalizer 220.

The equalizer 220 performs equalization for each channel-estimated block output by the channel estimator 215. Equalization refers to the signal processing and filtering technique for correcting and compensating distortion and interference on the channel by equalizing the characteristics of amplitude and phase across an entire frequency bandwidth.

According to an exemplary embodiment of the present invention, the equalizer 220 includes the SNR measurer 220A. The SNR measurer 220A measures the SNR for each block and supplies the measurement results to the decoding controller 250A. The buffer 230 buffers the blocks output by the equalizer 230 by matching to specific addresses and outputs the buffered block to the decoder 240 in response to an output command of the controller 250.

The decoder 240 performs decoding on the blocks output by the buffer 230. According to an exemplary embodiment of the present invention, the decoder 240 can be a turbo decoder which performs decoding on the same block several times.

According to an exemplary embodiment of the present invention, the decoder 240 receives the information on the number of decoding iterations of each block from the controller 250. The number of decoding iterations can be a maximum number of decoding times to repeat decoding on the corresponding block. The decoder 240 performs a number of decoding operations on the received block up to the maximum number of decoding iterations. If a decoding result equal to or greater than a specific value is acquired before the maximum number of decoding iterations is reached, the decoder 240 stops decoding on the current block, which is referred to as 'early stop'. If early stop occurs, the decoder 240 generates an early stop indication signal for the current block and sends the early stop indication signal to the controller 250. If the decoding result is less than a specific value even after the maximum number of decoding iterations, the decoder stops decoding on the current block and starts decoding on the next block. A description of the conditions for the early stop on the current block is described below.

The decoder 240 (e.g., a turbo decoder) calculates the Log-Likelihood Ratio (LLR) of each decoded bit. The LLR is the value expressed in the form of Log-Likelihood Ratio of the each bit to the received signal. LLR is expressed statically as a distance between the received signal and the original signal such that the value of LLR increases as the channel conditions becomes good. Accordingly, when the channel condition is good, the absolute value of LLR increases as the number of turbo decoding iterations increases. If the absolute value of the average LLR is greater than a threshold value, the turbo decoding result is determined to be accurate and the decoding process is stopped. The threshold value can be set to a value obtained through simulations.

The controller 250 controls entire operations of the digital broadcast receiver 200. The controller 250 includes the decoding controller 250A for adjusting the number of decoding iterations and the decoding order of the block of received signal.

The decoding controller 250A controls the process of adjusting the decoding order and the number of decoding iterations on the received block. The decoding controller 250A receives the SNR measurement value of each block from the SNR measurer 220A and stores the SNR measurement value in a storage unit (not shown). The decoding controller 250 also generates address information of each block output from the equalizer 220 and stores the block into the corresponding address of the buffer 230.

If a predetermined number of blocks are buffered in the buffer 230, the decoding controller 250 determines the decoding order of the blocks according to the SNR values measured at individual blocks. According to an exemplary embodiment of the present invention, one slot of ATSC-M/H includes 10 blocks, such that the decoding controller 250A can determine the decoding order in 10 block units. The decoding controller 250A determines the decoding order such that the blocks are decoded in descending order of their SNRs. This indicates that the early stop is likely to occur in blocks having a high SNR. In this case, the surplus number of decoding iterations can be reallocated for decoding subsequent blocks.

Simultaneously, the decoding controller 250A determines the number of decoding iterations of each block and informs the decoder 240 of the number of decoding iterations. According to an exemplary embodiment of the present invention, the number of decoding iterations can be the maximum decoding times permitted to be repeated on the corresponding block. Once the number of decoding iterations has been determined, the decoding controller 250A issues a transfer command to the buffer 230 such that the decoder 244 decodes the blocks read out from the buffer 230 in the decoding order.

Blocks having a high SNR value can be decoded successfully with fewer decoding iterations than the maximum number of decoding iterations. This is referred to as early stop. If the early stop is detected, the decoder 240 sends an early stop indication signal to the controller 250.

If the early stop indication signal is received, the decoding controller 250A calculates the difference between the maximum number of decoding iterations and the number of actually performed decoding iterations as a saved number of decoding iterations. The decoding controller 250A reallocates the saved number of decoding iterations for decoding of the remaining blocks. In an exemplary embodiment of the present invention, the decoding controller 250A can allocate the saved number of decoding iterations for the remaining individual blocks uniformly or for only the block having the least SNR value. However, the reallocation of the saved number of decoding iterations is not limited to the aforementioned scheme and can be applied in various manners. According to an exemplary embodiment of the present invention, the decoding controller 250A adjusts the decoding order of the blocks and number of decoding iterations for each block, resulting in improvement of decoding performance.

Figure 3:
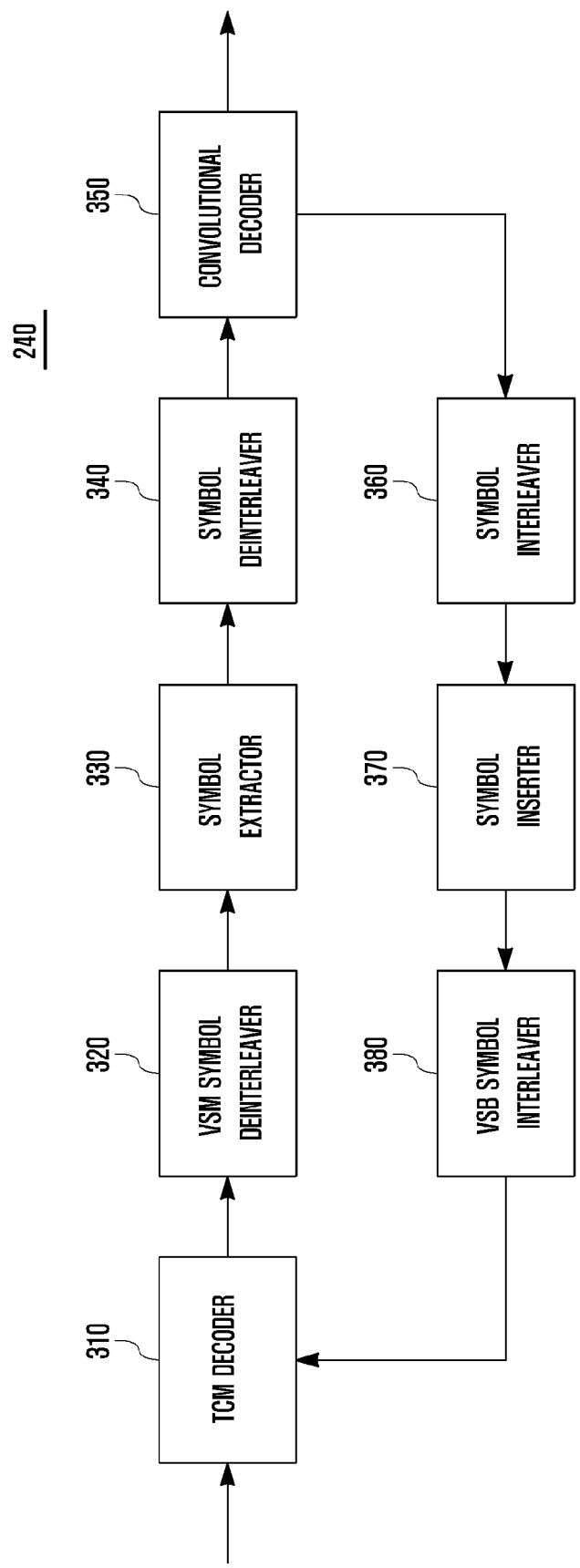
FIG. 3 is a block diagram illustrating a configuration of the decoder of FIG. 2 according to an exemplary embodiment of the present invention.

FIG. 3 is a block diagram illustrating a configuration of the decoder 240 of FIG. 2 according to an exemplary embodiment of the present invention.

Referring to FIG. 3, the decoder 240 includes a Trellis-Coded Modulation (TCM) decoder 310, a Vestigial SideBand (VSB) symbol deinterleaver 320, a symbol extractor 330, a symbol deinterleaver 340, a convolutional decoder 350, a symbol interleaver 360, a symbol inserter 370, and a VSB symbol interleaver 380.

The TCM decoder 310 performs decoding on the Trellis-encoded VSB data field and M/H data. Since the Trellis coding is a kind of convolutional coding, the decoding is performed by calculating the probability value of each Trellis Branch through Maximum A Posteriori (MAP) operation.

In order to maintain compatibility with the conventional VSB system, the ATSC-M/H data is interleaved in the VSB data field. The VSB symbol deinterleaver 320 performs deinterleaving on the entire VSB symbol. The symbol extractor 330 extracts the data of SCCC block from the deinterleaved VSB field data. The M/H data is carried at a fixed position in the VSB field data region, and the position of the M/H data is provided via a lookup table. The symbol deinterleaver 340 performs deinterleaving on the M/H data extracted by the symbol extractor 330.

The SCCC block is convolutionally encoded, and the convolutional decoder 350 performs MAP decoding on the SCCC block. The symbol interleaver 360 performs interleaving on the output value of the convolutional decoder 350 for feedback. The symbol inserter 370 inserts the M/H data into the VSB data field. The VSB symbol interleaver 380 performs interleaving on the entire VSB data field and feeds back the interleaved VSB data field to the TCM decoder 310.

Figure 4:
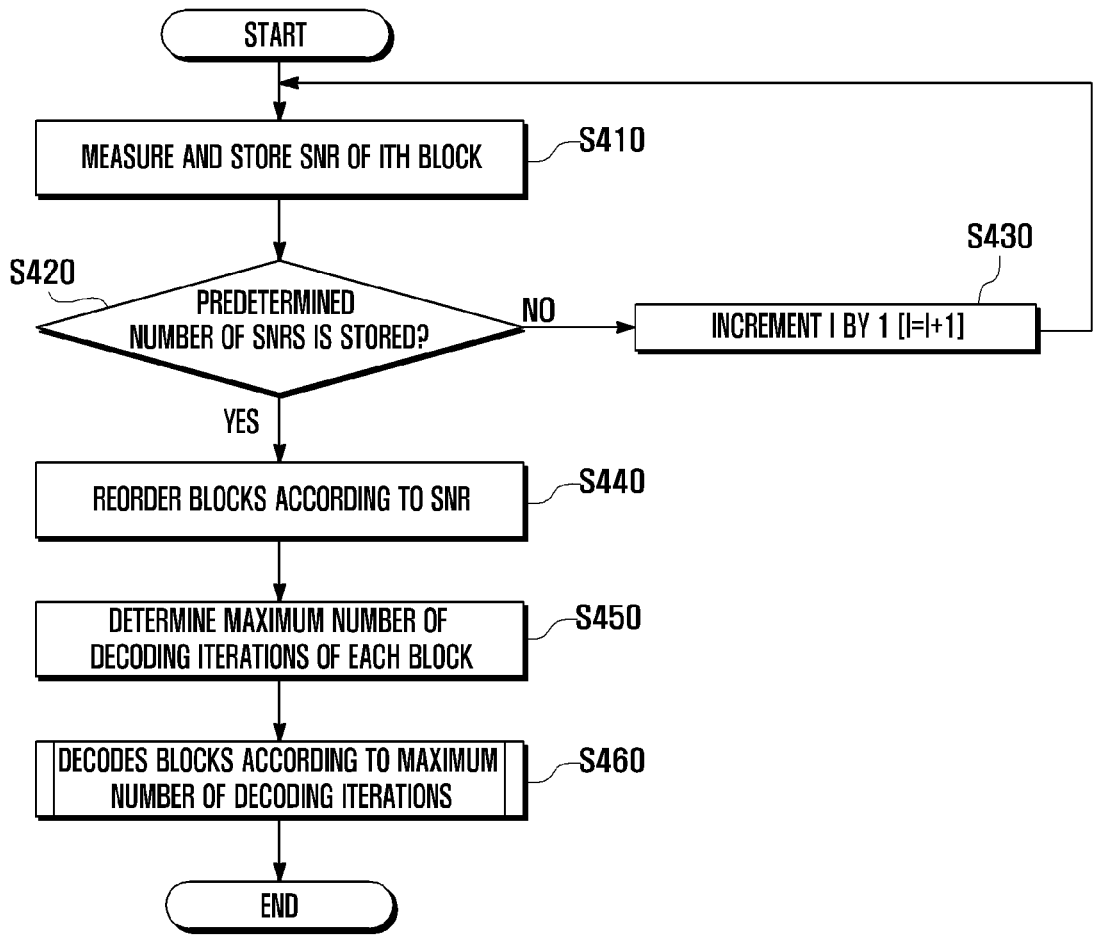
FIG. 4 is a flowchart illustrating a method for a digital broadcast receiver to decode received data blocks according to an exemplary embodiment of the present invention.

FIG. 4 is a flowchart illustrating a method for a digital broadcast receiver to decode received data blocks according to an exemplary embodiment of the present invention.

Referring to FIG. 4, the channel estimation and equalization with the data blocks transmitted by the transmitter is known in the art, the description thereof is omitted herein for brevity. As aforementioned, one M/H slot includes 10 M/H blocks composed of 16 segments in the ATSC-M/H system. Accordingly, the receiver groups the received data blocks into slots and determines the decoding order of the blocks and the number of decoding iterations of each block in a slot. Although the description is directed to the ATSC-M/H system operating as aforementioned, the present invention is not limited thereto.

When the $i^{th}$ block is received, the decoding controller 250A receives the SNR value measured to the $i^{th}$ block from the SNR measurer 220A and stores the received block with its SNR value in step S410.

The decoding controller 250A determines whether a number of stored SNRs matching the received blocks are equal to a predetermined number of blocks in step S420 (here, 10 blocks). If the number of stored SNRs is not equal to the predetermined number of blocks, the decoding controller 250A increments the value i by 1 in step S430 and repeats steps S410 and S420.

If the number of stored SNRs is equal to the predetermined number of blocks, the decoding controller 250A reorders the blocks in a slot according to the SNR values measured in the individual blocks in step S440. According to an exemplary embodiment of the present invention, the decoding controller 250A reorders the blocks in descending order of the SNRs such that the block having the highest SNR is decoded first. The larger the SNR value, the higher the channel estimation performance; accordingly, the probability of early stop increases as the channel estimation performance decreases. Any decoding iterations saved due to early stops can be reallocated for decoding subsequent blocks.

After reordering the blocks in descending order of SNRs, the decoding controller 250A determines a maximum number of decoding iterations of each block in step S450. The maximum number of decoding iterations can be set to a constant value for all of the 10 blocks or a variable value that increases as the channel estimation performance decreases. Finally, the decoding controller 250A performs decoding on each block according to the maximum number of decoding iterations in step S460.

Figure 5:
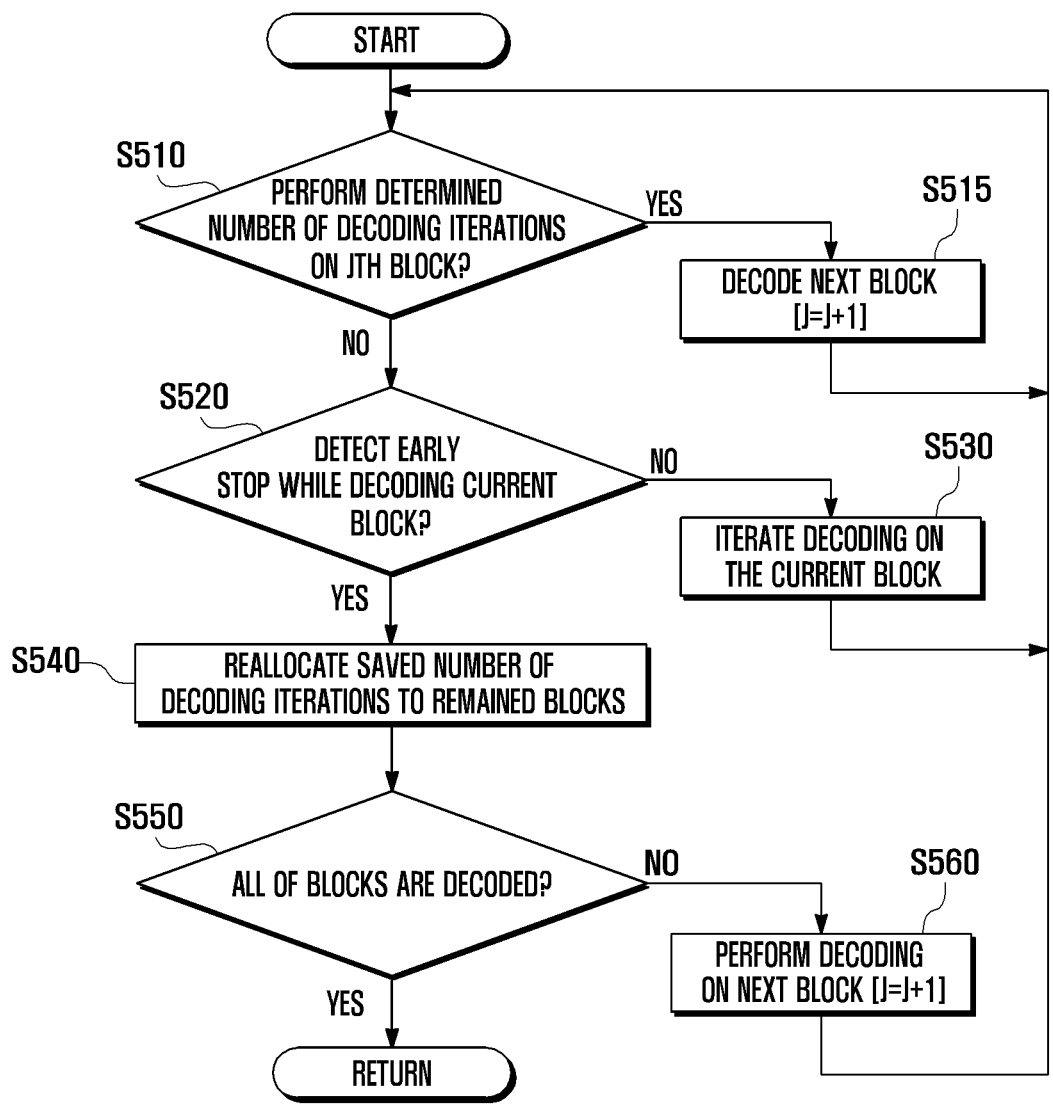
FIG. 5 is a flowchart illustrating steps of decoding process of FIG. 4 according to an exemplary embodiment of the present invention.

FIG. 5 is a flowchart illustrating steps of the decoding process 460 of FIG. 4 according to an exemplary embodiment of the present invention.

Referring to FIG. 5, once entering the decoding process, the decoding controller 250A first determines whether the number of decoding iterations to the $j^{th}$ block has reached the maximum number of decoding iterations in step S510. Here, it is assumed that the $i^{th}$ block is rearranged so as to be regarded as $i^{th}$ block. If the number of decoding iterations of the $j^{th}$ block has reached the maximum number of decoding iterations, the decoding controller 250A increments the block index (j=j+1) to decode the next block in step S515.

Otherwise, if the number of decoding iterations of the jth block has not reached the maximum number of decoding iterations at step S510, the decoding controller 250A determines whether an early stop occurs in the decoding process of the current block in step S520. If the early stop has occurred, the decoder 240 outputs an early stop indication signal to the decoding controller 250A. Accordingly, the decoding controller 250A can determine whether the early stop has occurred in the decoding process of the current block. If no early stop has occurred, the decoding controller 250A iterates decoding on the current block in step S530.

If the early stop has occurred, the decoding controller 250A stops decoding the current block and calculates the difference between the maximum number of decoding iterations and the number of actually performed decoding iterations, i.e. the saved number of decoding iterations by the early stop. The decoding controller 250A reallocates the saved number of decoding iterations for the remaining blocks in step S540. According to an exemplary embodiment of the present invention, the decoding controller 250A can reallocate the saved number of decoding iterations to the remaining individual blocks uniformly or all to the block having the least SNR value. The reallocation of the saved number of decoding iterations is not limited to the aforementioned scheme, and can be applied in various manners.

After reallocating the saved number of decoding iterations, the decoding controller 250A determines in step S550 whether all of the blocks of the current slot have been decoded, i.e. whether 10 blocks have been decoded. If any of the blocks of the current slot have not been decoded, the decoding controller 250A increments the block index by 1 in step S560 to decode the next block.

Figure 6:
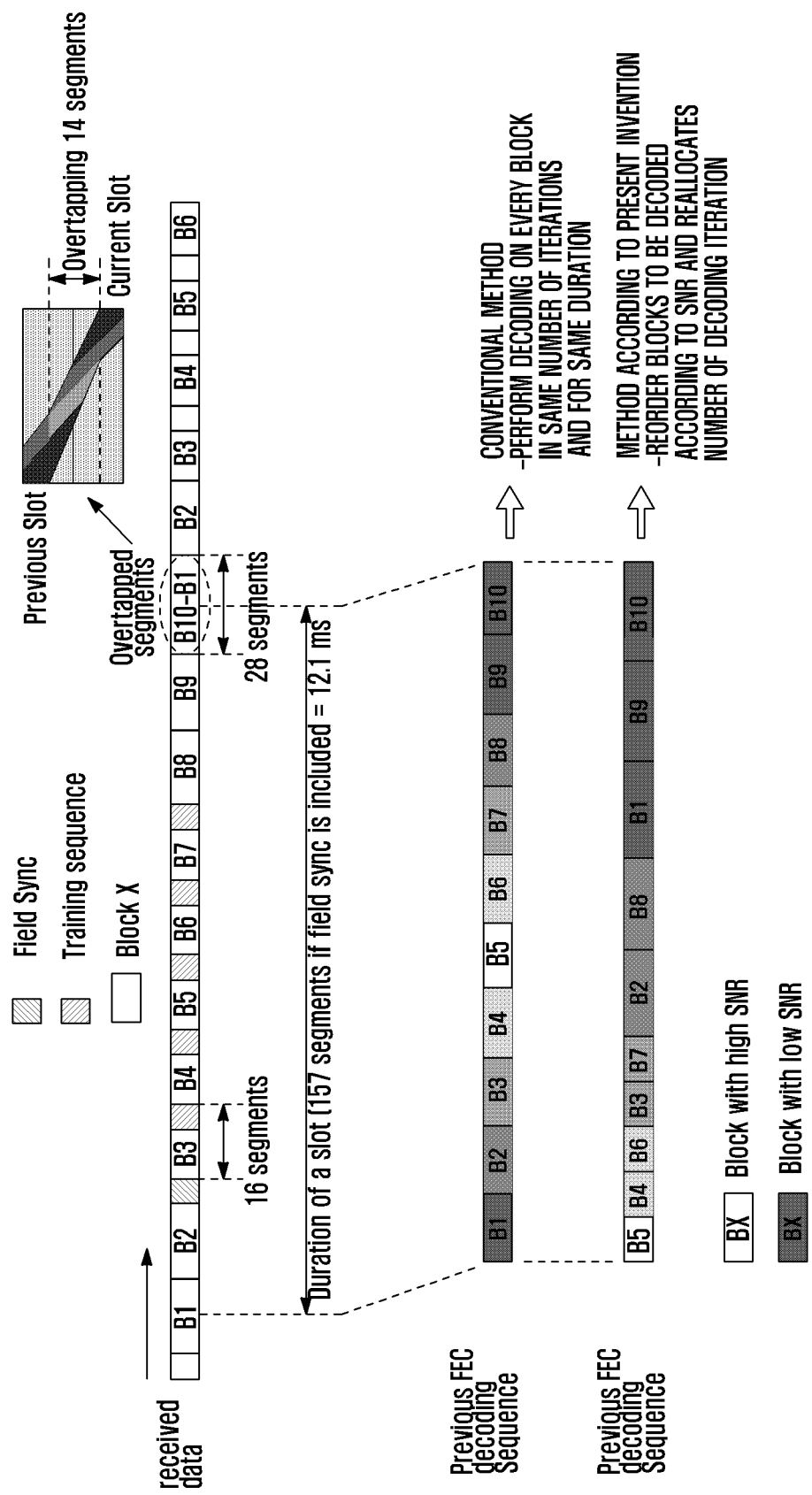
FIG. 6 is a diagram illustrating a principle of a decoding method according to an exemplary embodiment of the present invention compared to that of the conventional decoding method.

FIG. 6 is a diagram illustrating a principle of a decoding method according to an exemplary embodiment of the present invention compared to that of the conventional decoding method.

Referring to FIG. 6, in the conventional method, the 10 buffered blocks are decoded through identical numbers of decoding iterations in sequential order. In contrast, a decoding method according to an exemplary embodiment of the present invention determines the decoding order of the blocks and the number of decoding iterations for each block depending on the measured SNRs of the individual blocks and reallocates the saved number of decoding iterations caused by the early stop in the decoding process of the block having high SNR to the remaining blocks.

In the exemplary case of FIG. 6, the block B5 with high SNR due to the concentration of the pilot signals is first decoded and then the blocks B4 and B6 are decoded in sequential order according to an exemplary embodiment of the present invention. The blocks B1 and B9 at the head and tail of the M/H slot are reallocated the saved number of decoding iterations such that the numbers of decoding iterations of the B1 and B9 increase, resulting in improvement of decoding performance.

As described above, the decoding method and apparatus of a digital broadcast system according to exemplary embodiments of the present invention decodes packets having the highest channel estimation performance first with a reduced number of decoding iterations, and reallocates the saved number of decoding iterations to the remaining packets having relatively low channel estimation performance, thereby improving the decoding performance of the received packets. The decoding method and apparatus for a digital broadcast system according to the present invention is capable of preventing the decoding performance degradation caused by the estimation performance difference between the received packets.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for decoding packets in a digital broadcast system, comprising:
   measuring Signal-to-Noise Ratios (SNRs) of individual packets within a slot;
   determining a decoding order of the packets according to the SNRs; and
   decoding the packets in the decoding order,
   wherein the determining of the decoding order comprises determining a maximum number of decoding iterations of each packet,
   wherein the decoding of the packets comprises:
      calculating a difference between the maximum number of decoding iterations and a number of actually iterated decodings to each packet as a saved number of decoding iterations;
      reallocating the saved number of decoding iterations to a packet having the least SNR among packets within the slot remaining to be decoded; and
      performing decoding iterations for a packet from the packets,
      wherein the performing decoding iterations comprises decoding, when a number of the decoding iterations of the packet from the packets reaches the maximum number of decoding iterations, a next packet in the determined decoding order, and
   wherein the decoding of the packets comprises:
      determining whether an early stop occurs while decoding each packet; and when an early stop occurs, reallocating a saved number of decoding iterations to packets remaining to be decoded.

2. The method of claim 1, wherein the decoding order is a descending order of the SNRs.

3. The method of claim 1, wherein the decoding of the packets comprises:

uniformly reallocating the saved number of decoding iterations to packets remaining to be decoded.

4. The method of claim 1, wherein the digital broadcast system is an Advanced Television System Committee Mobile/Handheld (ATSC-M/H) system.

5. An apparatus for decoding packets in a digital broadcast system, comprising:

a Signal-to-Noise Ratio (SNR) measurer for measuring SNRs of individual packets within a slot;

a decoding controller for determining a decoding order of the packets according to the SNRs;

a decoder for decoding the packets in the decoding order, wherein the decoding controller determines a maximum number of decoding iterations of each packet, wherein the decoding controller calculates a difference between the maximum number of decoding iterations and a number of actually iterated decodings to each packet as a saved number of decoding iterations, and reallocates the saved number of decoding iterations to a packet having the least SNR among packets within the slot remaining to be decoded, and performs decoding iterations for a packet from the packets, wherein the decoding controller performs, when a number of the decoding iterations of the packet from the packets reaches the maximum number of decoding iterations, decoding a next packet in the decoding order, and wherein the decoding controller determines whether an early stop occurs while decoding each packet and, when an early stop occurs, reallocates a saved number of decoding iterations to packets remaining to be decoded.

6. The apparatus of claim 5, wherein the decoder detects an early stop while decoding each packet and, when the early stop is detected, sends the early stop indication signal to the decoding controller.

7. The apparatus of claim 5, wherein the decoding order is a descending order of the SNRs.

8. The apparatus of claim 5, wherein the decoding controller uniformly reallocates the saved number of decoding iterations to packets remaining to be decoded.

9. The apparatus of claim 5, wherein the digital broadcast system is an Advanced Television System Committee Mobile/Handheld (ATSC-M/H) system.

10. A method of decoding packets in a digital broadcast system, the method comprising:

measuring Signal-to-Noise Ratios (SNRs) of individual packets within a slot;

determining an order in which the packets within the slot will be decoded, based on the SNRs of the packets, for each packet to be decoded, assigning a maximum number of decoding operations;

decoding the packets in the determined order based on the assigned maximum number of decoding operations;

when a packet is decoded in less than the assigned maximum number of decoding operations, allocating remaining decoding operations to a packet having the least SNR among packets within the slot remaining to be decoded; and decoding, when the assigned maximum number of decoding operations have been reached, a next packet in the determined order, wherein the decoding of the packets comprises:

determining whether an early stop occurs while decoding each packet; and when an early stop occurs, reallocating a saved number of decoding iterations to packets remaining to be decoded.

11. The method of claim 10, wherein the allocating of the remaining decoding operations comprises:

allocating the remaining decoding operations to the remaining packets uniformly.

12. The method of claim 10, wherein the allocating of the remaining decoding operations comprises:

allocating the remaining decoding operations to the remaining packets based on the SNRs of the remaining packets.

13. The method of claim 12, wherein the allocating of the remaining decoding operations further comprises allocating the remaining decoding operations to the remaining packets in ascending order to the SNRs of the remaining packets.

14. The method of claim 10, wherein the determining of the order of the packets comprises:

determining the order of the packets in descending order of the corresponding SNR.

* * * * *